United States Patent [19]

Weldin

[11] Patent Number: 4,602,694
[45] Date of Patent: Jul. 29, 1986

[54] MOTOR GENERATOR ELECTRIC AUTOMOTIVE VEHICLE

[75] Inventor: William Weldin, 7300 NE. 16th Ave. #1, Vancouver, Wash. 98665

[73] Assignee: William Weldin, Vancouver, Wash.

[21] Appl. No.: 635,406

[22] Filed: Jul. 30, 1984

[51] Int. Cl.$^4$ .............................................. B60L 9/00
[52] U.S. Cl. ..................................... 180/2.2; 180/65.3
[58] Field of Search ...................... 180/2.2, 65.1, 65.3, 180/65.6

[56] References Cited

U.S. PATENT DOCUMENTS

| | | | |
|---|---|---|---|
| 778,133 | 12/1904 | Keates | 180/65.3 |
| 1,562,903 | 11/1925 | Miller | 180/65.3 |
| 4,113,047 | 9/1978 | Turner | 180/65.3 |
| 4,218,624 | 8/1980 | Schiavone | 180/65.3 |
| 4,270,622 | 6/1981 | Travis | 180/65.3 |
| 4,413,698 | 11/1983 | Conrad et al. | 180/65.1 |

FOREIGN PATENT DOCUMENTS

| | | | |
|---|---|---|---|
| 2225081 | 1/1974 | Fed. Rep. of Germany | 180/65.3 |
| 2256649 | 7/1975 | France | 180/65.3 |

OTHER PUBLICATIONS

PCT/US82/00906, Cullin, An Electro-Mechanical-Hydraulic Power Generating System, pp. 1-24.

Primary Examiner—Craig R. Feinberg
Assistant Examiner—David A. Okonsky

[57] ABSTRACT

This electric automobile is so designed, as to obtain a mileage range up to four hundred miles, as compared with present electrics, which attain only a range of forty miles, and this electric automobile attains a speed of sixty miles per hour, as compared with the forty obtained of such cars. Primarily, it consists of a small motor which drives a D.C. generator, which supplies current to drive the car's drive motor. It further includes batteries, which are aided in replenishing their current by a solar cell bank, which produces electricity from the rays of the sun and other light.

1 Claim, 3 Drawing Figures

MOTOR GENERATOR ELECTRIC AUTOMOTIVE VEHICLE

This invention relates to electric vehicles, and more particularly, to a motor generator electric automotive vehicle.

The principal object of this invention is to provide a motor generator electric automotive vehicle, which will be an improvement over electric vehicles of the prior art, in that its mileage range will be substantially increased. At present, the range of such vehicles is forty miles, and the range of the present invention is approximately four hundred miles.

Another object of this invention is to provide a motor generator electric automotive vehicle, which will be of such design as to have speeds up to sixty miles an hour, as compared to the forty miles per hour of such vehicles of the prior art.

A further object of this invention is to provide a motor generator electric automotive vehicle, which will include solar cell means for aid in recharging its batteries, and complete recharging thereof will be effected by plugging the system into a common A.C. current home receptacle.

Other objects are to provide a motor generator electric automotive vehicle, which is simple in design, inexpensive to manufacture, rugged in construction, easy to use, and efficient in operation.

These, and other objects, will be readily evident, upon a study of the following specification, and the accompanying drawing, wherein.

Figure 1:
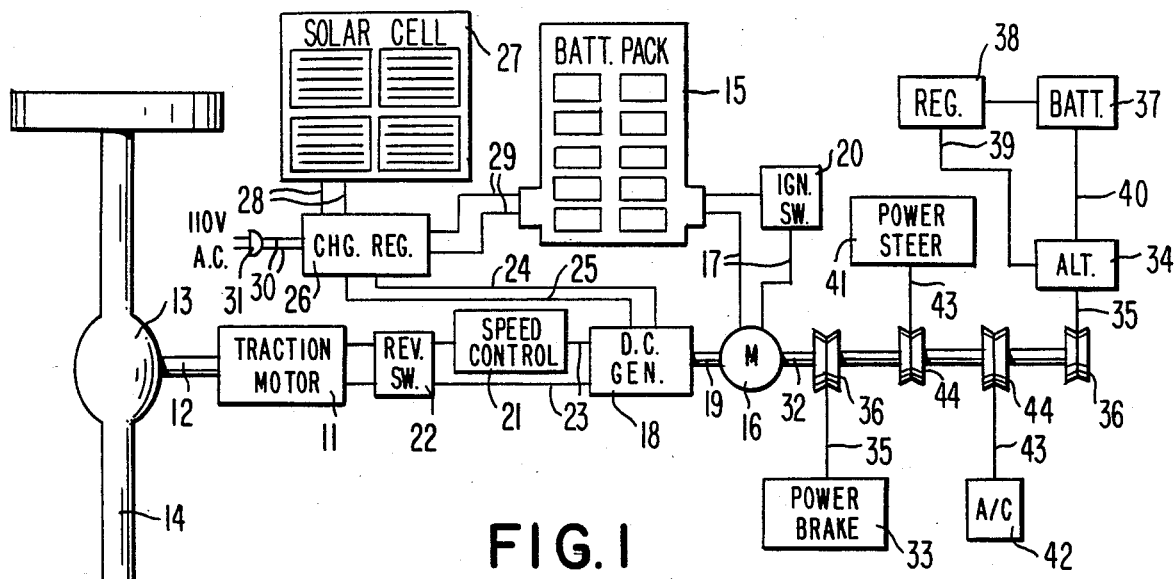
FIG. 1 is a diagrammatic view of the present invention.

Accordingly, a vehicle 10 is shown to include a traction or drive motor 11, coupled to the drive shaft 12 of the differential 13 of the vehicle's axle 14. The main battery bank 15 feeds a small electric motor 16 through wires 17, and motor 16 drives large D.C. generator 18, which is coupled thereto by shaft 19. An on-off switch 20 is wired in series with one of the wires 17 to motor 16, for controlling it, and a speed control unit 21, attached to the vehicle's accelerator pedal (not shown) is coupled with a double pole - double throw reverse switch 22 in the wires 23, for control of drive motor 11, which is known in the art. When motor 11 is not taking all of the generator 18 output, the current difference is sent back to battery bank 15 by wires 24 and 25, which are coupled to the charger regulator 26. A bank of solar cells 27 are coupled, by wires 28, to charger regulator 26, for help in recharging battery bank 15, and this current is fed to battery bank 15 by wires 29, which are connected between regulator 26 and battery bank 15. When the current is depleted in battery bank 15, bank 15 will be recharged by means of wires 30 connected to plug 31, which is the house A.C. input from a suitable receptacle into the charger regulator 26.

Shaft 32 of motor 16 serves to drive the power brakes 33 and the present alternator 34 of vehicle 10, by means of belts 35 and pulleys 36. The alternator 34 is coupled to the vehicle's present battery 37 and present regulator 38, by means of cables 39 and 40 respectively, and shaft 19 may optionally drive such equipment, as the power steering unit 41 and the air conditioner 42, by means of belts 43 and pulleys 44.

In operation, the motor 16 is turned on by switch 20, which causes current to flow to small motor 16, which drives shaft 19 and 32 simultaneously. Shaft 19 rotates generator 18, which produces current that powers drive motor 11 through the speed control unit 21, operated by the driver's foot. As the abovementioned occurs, the excess current from generator 18 is fed back to battery bank 15 through the charger regulator 26, and, as the vehicle is driven by motor 11, the solar cell bank, employing solar energy, will aid in supplying current to the battery bank 15. The shaft 32, when vehicle 10 is being driven, will operate the power brakes 33 and the alternator, by the belt 35 and pulley 36 means. When reversing the direction of travel of vehicle 10, the reverse switch 22 is used, which switches the polarity of current from generator 18 to drive motor 11, thus reversing its rotation.

Figure 2:
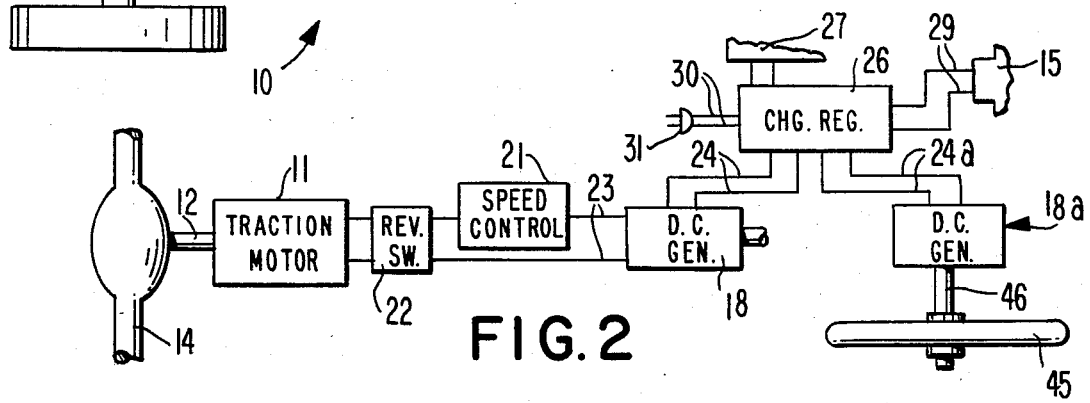
FIG. 2 is a diagrammatic view, showing a modified form in-transit charging means.
Figure 3:
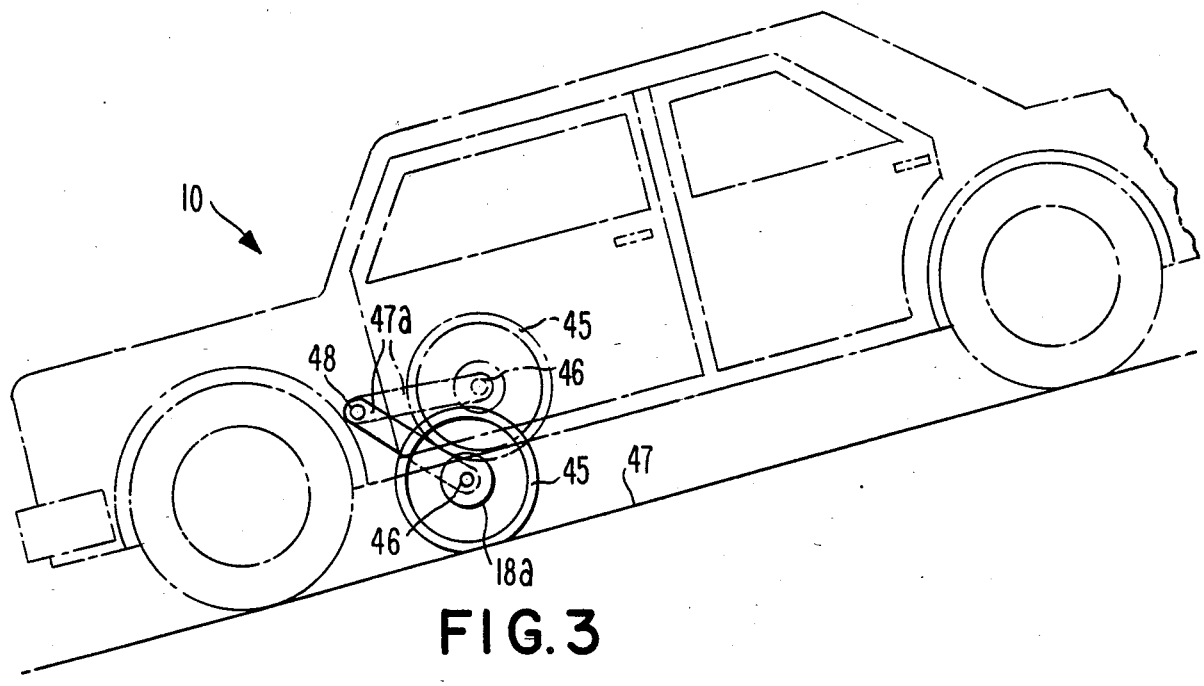
FIG. 3 is a side view of a vehicle, shown in phantom lines, illustrating the modified in-transit charging means.

Looking now at FIGS. 2 and 3, a modified form of D.C. generator 18a is provided, which includes a wheel 45 connected to its shaft 46, for contact with ground surface 47, so as to take advantage of long downgrades when on long trips, without causing drag on the vehicle 10. The shaft 46 thereof is suitably mounted in one end of a pivotal lever 47a, which is secured in a suitable manner, by pivot pin 48, to any desired location in the vehicle 10. Lever 47a is lowered and raised by suitable means (not shown), and generator 18a serves as auxiliary power means for charging the battery bank 15, and it is wired in parallel with generator 18 to charging regulator 26, by wires 24a.

In operation, the driver lowers the wheel 45 and generator 18a combination, until wheel 45 is in rolling engagement with ground surface 47, and the result is, that wheel 45 rotates generator 18a, which provides additional power generation for the charging of battery bank or pack 15. When not on a downgrade, the driver pivots lever 47a upward until another downgrade.

While various changes may be made in the detail construction, it is understood that such changes will be within the spirit and scope of the present invention, as is defined by the appended claims.

What I now claim is:

1. A motor generator electric automotive vehicle, comprising, in combination, a traction drive motor coupled by a first drive shaft to a differential of an axle of said vehicle, a main battery bank electrically connected by wires to a small electric motor driving a large D.C. generator having a second drive shaft therebetween, an on-off switch in series with one of said wires to said small motor, a speed control unit attached to an accelerator pedal of said vehicle being coupled with a double pole - double throw reverse switch to said traction drive motor, a charger regulator electrically connected to said generator, a bank of solar cells coupled to said charge regulator, an electric extension cord from said charge regulator having a plug on its end for selective connection to an exterior electric power source, a plurality of pulleys on said second drive shaft, a belt unit driven by each said pulley, one said belt unit being connected to a present alternator of said vehicle which is coupled to a present battery and present regulator of said vehicle, and other of said units being connected to power brakes and equipment including power steering and an air conditioner.

* * * * *